US010343935B2

(12) United States Patent
Caldwell et al.

(10) Patent No.: US 10,343,935 B2
(45) Date of Patent: Jul. 9, 2019

(54) FLUID TREATMENT SYSTEM

(71) Applicant: Trojan Technologies, London (CA)

(72) Inventors: Christopher Bruce Caldwell, Stoney Creek (CA); Scott Thomas Duyn, St. Catharines (CA); Julian Giggs, Brantford (CA)

(73) Assignee: TROJAN TECHNOLOGIES, London, Ontario (CA)

( * ) Notice: Subject to any disclaimer, the term of this patent is extended or adjusted under 35 U.S.C. 154(b) by 0 days.

(21) Appl. No.: 15/744,256

(22) PCT Filed: Jul. 12, 2016

(86) PCT No.: PCT/CA2016/050815
§ 371 (c)(1),
(2) Date: Jan. 12, 2018

(87) PCT Pub. No.: WO2017/008156
PCT Pub. Date: Jan. 19, 2017

(65) Prior Publication Data
US 2018/0208485 A1    Jul. 26, 2018

Related U.S. Application Data

(60) Provisional application No. 62/231,702, filed on Jul. 14, 2015.

(51) Int. Cl.
*C02F 1/32* (2006.01)
(52) U.S. Cl.
CPC ........ *C02F 1/325* (2013.01); *C02F 2201/004* (2013.01); *C02F 2201/3223* (2013.01)

(58) Field of Classification Search
CPC ................ C02F 1/325; C02F 2201/004; C02F 2201/3223
USPC ....... 250/453.11, 454.11, 455.11, 428, 432 R
See application file for complete search history.

(56) References Cited

U.S. PATENT DOCUMENTS

| 5,471,063 A | 11/1995 | Hayes et al. |
| 2013/0234037 A1* | 9/2013 | Moglan ..................... A61L 2/10 |
| | | 250/432 R |

FOREIGN PATENT DOCUMENTS

| CN | 20255268 | 11/2012 |
| EP | 2824077 | 1/2015 |
| WO | 2012/037644 | 3/2012 |

(Continued)

OTHER PUBLICATIONS

European Patent Office, Communication pursuant to Article 94(3) EPC, dated Aug. 14, 2018, pp. 5.

(Continued)

*Primary Examiner* — Nicole M Ippolito
(74) *Attorney, Agent, or Firm* — Ference & Associates LLC

(57) ABSTRACT

There is described, a fluid treatment system comprising: a fluid treatment chamber comprising a fluid inlet, a fluid outlet and a fluid treatment zone; an elongate radiation source assembly comprising an elongate radiation source configured to be disposed in the fluid treatment zone; and a lamp socket element secured to a proximal portion of the fluid treatment chamber, the lamp socket element configured to be disengaged from the elongate radiation source assembly only when the fluid treatment chamber is fluid non-pressurized.

22 Claims, 6 Drawing Sheets

(56) References Cited

FOREIGN PATENT DOCUMENTS

WO    2015/154166    10/2015

OTHER PUBLICATIONS

International Search Report, dated Oct. 13, 2016, 3 pages.
International Searching Authority, Written Opinion of the International Searching Authority, dated Oct. 13, 2016, 5 pages.

* cited by examiner

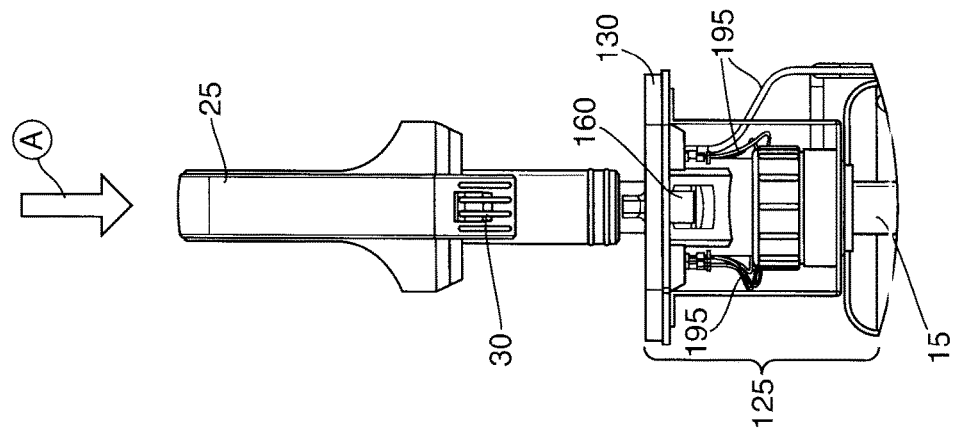
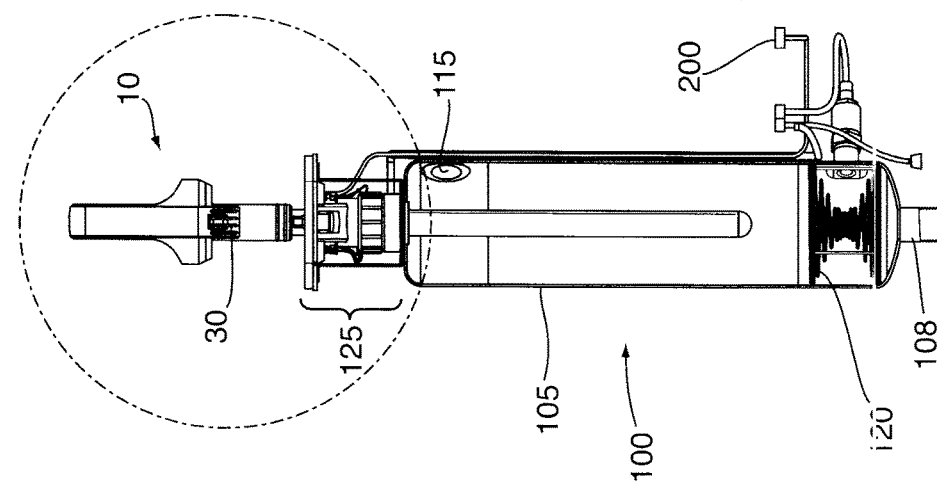
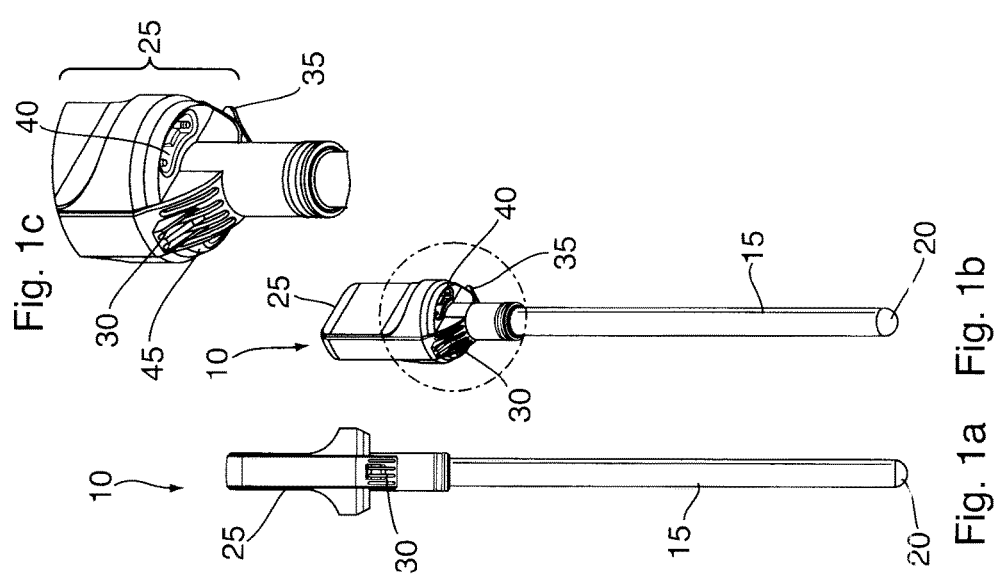

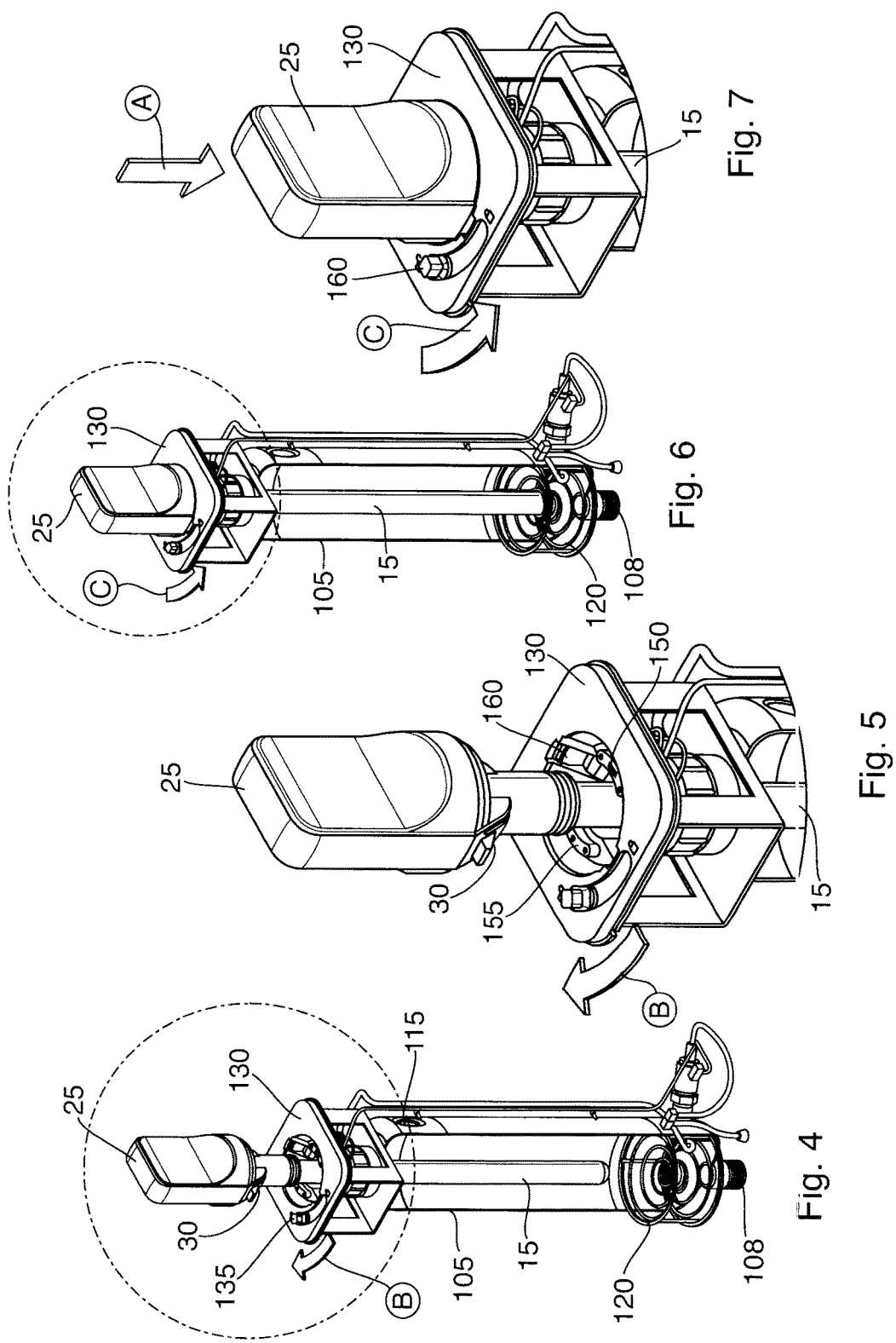

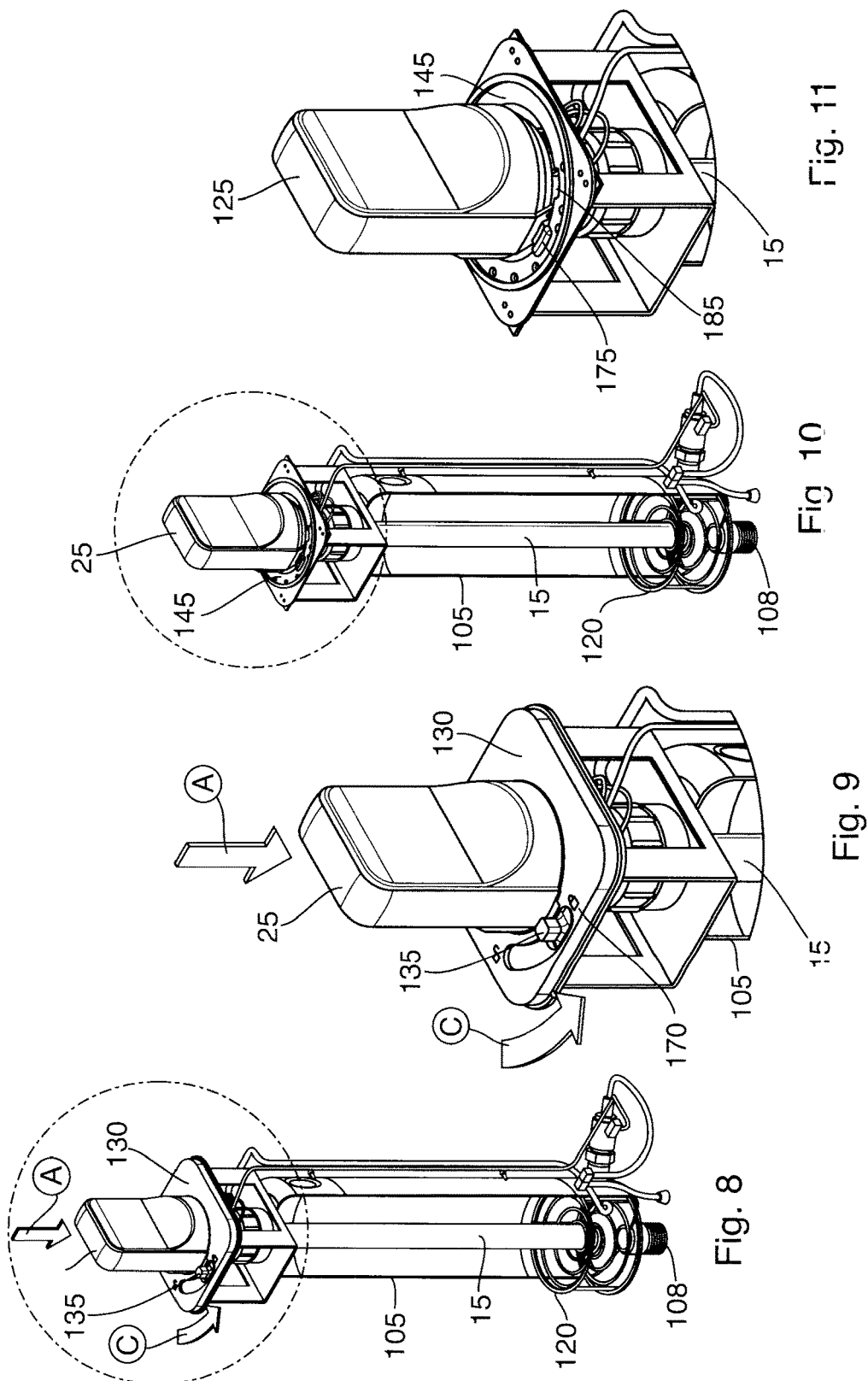

FLUID TREATMENT SYSTEM

CROSS-REFERENCE TO RELATED APPLICATION

The present application is a National Phase Entry of PCT International Application No. PCT/CA2016/050815, which was filed on Jul. 12, 2016, and claims the benefit under 35 U.S.C. § 119(e) of provisional patent application Ser. No. 62/231,702, filed Jul. 14, 2015, the contents of which are hereby incorporated by reference.

BACKGROUND OF THE INVENTION

Field of the Invention

The present invention relates to a fluid treatment device. More particularly, in its preferred embodiment, the present invention relates to an ultraviolet radiation water treatment device.

Description of the Prior Art

It is known that irradiation of a fluid, such as water, with ultraviolet light will disinfect the water through inactivation of microorganisms therein, provided the irradiation intensity and exposure duration are above a minimum "dose" level (often measured in units of microwatt seconds per square centimeter).

Ultraviolet water disinfection units employ this principle to disinfect water for human consumption. Generally, water to be disinfected passes through a pressurized stainless steel cylinder which is flooded with ultraviolet radiation. Large scale municipal wastewater treatment equipment, such as that commercially available from Trojan Technologies under the tradename UV3000+ and Signa, employ this same principle to disinfect treated wastewater. Specifically, ultraviolet radiation emitting lamps are submerged in an open channel wherein the wastewater is exposed to radiation as it flows past the lamps. For further disclosure of fluid purification systems employing ultraviolet radiation see U.S. Pat. Nos. 4,482,809, 4,872,980 and 5,006,244.

Residential ultraviolet water disinfection products can vary in exact construction from one manufacturer to the next while still achieving similar operational characteristics. The major components that are common to most or all residential ultraviolet water disinfection units include: an ultraviolet radiation lamp; a water cylinder (often constructed of stainless steel because of the inherent resistance to corrosion and ultraviolet radiation); fastening fixtures/devices to secure the lamp in the cylinder; sealing devices to prevent water leakage from the entry point(s) of the lamp; a lamp ballast (power supply and starter); and power cords to connect the lamp to the ballast and to connect the ballast to external power.

In addition, many residential ultraviolet disinfection products also contain the following components: a quartz sleeve with a larger diameter than the ultraviolet radiation lamp, which encases and thus protects the ultraviolet radiation lamp; an electrical circuit or printed circuit board which is capable of monitoring the lamp operation, monitoring signal(s) from an ultraviolet radiation intensity sensor built into the cylinder, and/or triggering alarms within the residence if the monitored signals indicate incorrect operation.

U.S. Pat. No. 5,471,063 (assigned to the assignee of the present invention). The '063 patent teaches fluid disinfection unit comprising a fluid treatment housing, an electrical supply module and electrical connection means connecting the fluid treatment housing and the electrical supply module. The fluid treatment housing comprises a fluid inlet and a fluid outlet in communication with a reaction chamber, an ultraviolet radiation lamp disposed in the reaction chamber and having a first electrical connector at a first end thereof and a second end thereof being closed. The second end of the ultraviolet radiation lamp is received and held in place by a tapered, helical spring. The electrical supply module comprises a ballast which may be removably connected to the ultraviolet radiation lamp and the electrical supply module.

Conventional residential UV purification systems consist of a mercury based UV Lamp installed in a quartz sleeve that has been installed in a chamber. The lamp ballast is typically mounted some distance away from the lamp and chamber assembly, and a power cord is run from the ballast to a plug configured to mate with the end of the lamp. In some conventional systems, the lamp is inserted into a protective quartz sleeve having a closed distal and this arrangement is then inserted into the chamber. A retaining nut or mechanical fastener is used to hold the quartz sleeve and lamp in position while the chamber is pressurized during operation.

In conventional systems, the head of the UV lamp typically has a custom mechanical configuration designed to allow for only a single correct manner of mechanically connecting the ballast plug to the lamp. The power cord runs some distance to the lamp and chamber. There are several inherent problems that exist with typical UV water disinfection chambers and ballast connections.

First, under Pressure, closed end quartz sleeves will have a force exerted by water pressure that tries to forcibly eject the quartz sleeve and lamp from the stainless steel chamber. If the mechanical fastener is not secured properly or if a person trying to conduct maintenance on the system forgets to depressurize their treatment chamber before disengaging the retaining nut or mechanical fastener, they could inadvertently eject their quartz material and mercury lamp out of the treatment chamber resulting in property damage or potential injury to the operator.

Second, in the event of a water leak around the quartz sleeve and O-ring that is intended to seal the treatment chamber, water can be forced up into the electrical connections and lead to a potential shock hazard if touched.

Third, if the ballast is connected in such a way that the power cord running to the lamp does not have a "drip loop" in it then if a water leak occurs, water can wick down the power cord and into the electrical ballast resulting in the risk of electrical shock or ballast failure.

Fourth, lamp signature recognition is not possible.

There have been prior attempts in the art to address these problems.

To prevent water ingress to the ballasts, the ballasts have been designed to try to be water tight, however, in mass production; it is challenging to ensure that all ballasts are completely sealed all the time. Inevitably, some will leak and cause field failures.

To prevent water getting into the plug and creating an electrical shock hazard, it is known to install a mechanical guard that prevents users from clasping the plug when powered. However, mechanical guards can be removed and are often not replaced after servicing.

Some systems do not use "domed" or closed ended quartz sleeves but instead have both ends "open ended". Thus the water pressure is balanced on the quartz sleeve creating a situation where a properly installed quartz sleeve should not forcibly eject. However, if the quartz is damaged or cracked, then the possibility of forcible ejection is still present if the user loosens the mechanical lock or retaining nut while pressurized.

Thus, notwithstanding the advances in the art, there is room for improvement. Specifically, there still exists a need in the art for a fluid treatment system that addresses one or more of the above-mentioned problems.

SUMMARY OF THE INVENTION

It is an object of the present invention to obviate or mitigate at least one of the above-mentioned disadvantages of the prior art.

It is another object of the present invention to provide a novel fluid treatment system.

Accordingly, in one of its aspects, the present invention provides a fluid treatment system comprising:

a fluid treatment chamber comprising a fluid inlet, a fluid outlet and a fluid treatment zone;

an elongate radiation source assembly comprising an elongate radiation source configured to be disposed in the fluid treatment zone; and a lamp socket element secured to a proximal portion of the fluid treatment chamber, the lamp socket element configured to be disengaged from the elongate radiation source assembly only when the fluid treatment chamber is fluid non-pressurized.

In another of its aspects, the present invention provides a fluid treatment system comprising:

a fluid treatment chamber comprising a fluid inlet, a fluid outlet and a fluid treatment zone;

a lamp socket element secured to a proximal portion of the fluid treatment chamber, the lamp socket element comprising a first locking element configured to be operable between a first locked position when the fluid treatment chamber is fluid pressurized and a second unlocked position when the fluid treatment chamber is fluid non-pressurized;

an elongate radiation source assembly configured to be disposed in the fluid treatment zone and comprising an elongate radiation source and a second locking element;

wherein the first locking element and the second locking element are configured to be irreversibly engaged in the first locked position.

Thus, the inventors have developed a fluid treatment system which is believed to obviate or mitigate at least some of the above-mentioned disadvantages of the prior art. A key feature of the present fluid treatment system is that the radiation source (typically an ultraviolet radiation lamp) cannot be mistakenly or unintentionally removed by the user from the fluid treatment chamber. This is a significant safety feature of the present fluid treatment system since it avoids the situation where a user mistakenly disconnects the radiation source assembly from the chamber while the chamber is pressurized risking injury to the user.

In a highly preferred embodiment of the present invention, the lamp socket element attached to the fluid treatment chamber comprises a locking element such as a retaining ring which is movable between a locked position and an unlocked position. In the locked position, the fluid treatment chamber is pressurized which helps maintain the radiation source assembly in the locked position. When it is desired to withdraw the radiation source assembly (e.g., to replace the radiation source), the locking elements (e.g., retaining ring) is moved to a second position which allows the radiation source assembly to be withdrawn from the fluid treatment chamber only when the fluid treatment chamber has been de-pressurized. The first locking element is configured such that a user cannot move the locking element to the second position while the fluid treatment chamber is pressurized. Thus, for example, the type of pressure needed by the user to withdraw the radiation source assembly when the fluid treatment chamber is non-pressurized is insufficient to move the locking element to a second position when the fluid treatment chamber is pressurized.

Other advantages associated with preferred embodiments of the present fluid treatment system include the following:
 the use of complementary integrated power and data connectors in the radiation source assembly and lamp socket element serving the dual purpose of powering the radiation source and obtaining diagnostic and other information (e.g., make, model, etc.) about the radiation source; and
 location of the power connection between the radiation source assembly and the lamp socket element remotely (e.g., above) with respect to the seal point therebetween thereby obviating the occurrence of short circuiting.

BRIEF DESCRIPTION OF THE DRAWINGS

Embodiments of the present invention will be described with reference to the accompanying drawings, wherein like reference numerals denote like parts, and in which:

FIG. 1(*a*) is a front view of a preferred embodiment of radiation source assembly for use in the present fluid treatment system;

FIG. 1(*b*) is a perspective view from below of the radiation source assembly illustrated in FIG. 1(*a*);

FIG. 1(*c*) is an enlargement of a portion of FIG. 1(*b*);

FIGS. 2-11 illustrate a preferred embodiment of the present fluid treatment system in which the radiation source assembly is being inserted into the fluid treatment chamber (FIGS. 3, 5, 7, 9 and 11 are enlargements of a portion of FIGS. 2, 4, 6, 8 and 10 respectively);

DETAILED DESCRIPTION OF THE PREFERRED EMBODIMENTS

Figure 14:
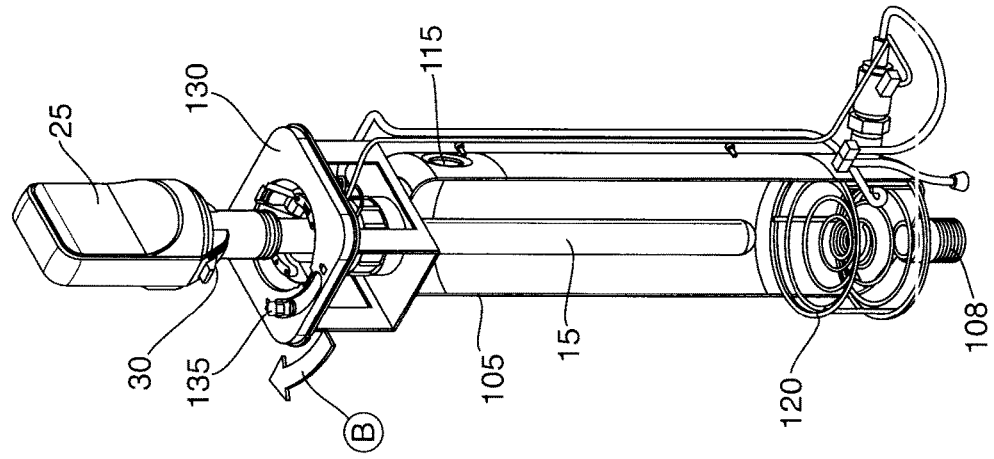
FIGS. 12-16 illustrate views of the fluid treatment system illustrated in FIGS. 2-11 showing in successive views removal of the radiation source assembly from the fluid treatment chamber (FIG. 16 is an enlargement of a portion of FIG. 15)
Figure 13:
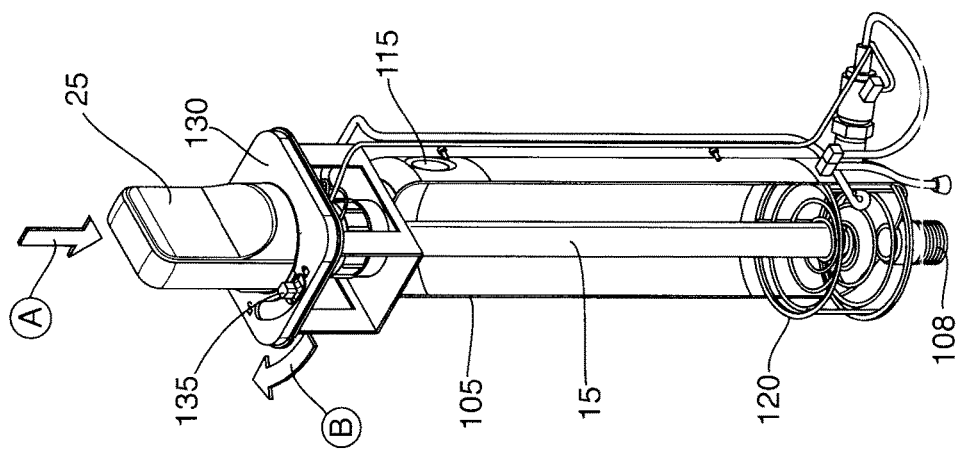

In a first embodiment, the present invention relates to a fluid treatment system comprising: a fluid treatment chamber comprising a fluid inlet, a fluid outlet and a fluid treatment zone; an elongate radiation source assembly comprising an elongate radiation source configured to be disposed in the fluid treatment zone; and a lamp socket element secured to a proximal portion of the fluid treatment chamber, the lamp socket element configured to be disengaged from the elongate radiation source assembly only when the fluid treatment chamber is fluid non-pressurized. Preferably, this first embodiment of the present fluid treatment system further comprises a first locking element configured to be operable between a first locked position when the fluid treatment chamber is fluid pressurized and a second unlocked position when the fluid treatment chamber is fluid non-pressurized.

In a second embodiment, the present invention relates to a fluid treatment system comprising: a fluid treatment chamber comprising a fluid inlet, a fluid outlet and a fluid treatment zone; a lamp socket element secured to a proximal portion of the fluid treatment chamber, the lamp socket element comprising a first locking element configured to be operable between a first locked position when the fluid treatment chamber is fluid pressurized and a second unlocked position when the fluid treatment chamber is fluid non-pressurized; an elongate radiation source assembly configured to be disposed in the fluid treatment zone and comprising an elongate radiation source and a second locking element; wherein the first locking element and the second locking element are configured to be irreversibly engaged in the first locked position.

Preferred embodiments of these first or second embodiments of the present fluid treatment system may include any one or a combination of any two or more of any of the following features:

- the first locking element is movable with respect to the lamp socket element;
- the first locking element is slidably movable with respect to the lamp socket element;
- the first locking element is rotably movable with respect to the lamp socket element;
- the elongate radiation source assembly further comprises a second locking element configured to be engagable with the first locking element in the first locked position;
- the first locking element comprises a ring element;
- the ring element comprises at least one first receptacle element for engagement with the second locking element in the first locked position;
- the second locking element comprises at least one tab element for engagement with the at least one receptacle element in the first locked position;
- the ring element further comprises at least one second receptacle element configured to allow disengagement of the second locking element from the ring element in the second unlocked position of the first locking element;
- the ring element comprises a plurality of first receptacle elements for engagement with the second locking element in the first locked position;
- the second locking element comprises a plurality of tab elements for engagement with the plurality of first receptacle elements in the first locked position;
- the ring element further comprises a plurality of second receptacle elements configured to allow disengagement of the second locking element from the ring element in the second unlocked position of the first locking element;
- the ring element comprises a pair of opposed first receptacle elements for engagement with the second locking element in the first locked position;
- the second locking element comprises a pair of opposed tab elements for engagement with the pair of opposed first receptacle elements in the first locked position;
- the ring element further comprises a pair of opposed second receptacle element configured to allow disengagement of the second locking element from the ring element in the second unlocked position of the first locking element;
- the ring element comprises a pair of diametrically opposed first receptacle elements for engagement with the second locking element in the first locked position;
- the second locking element comprises a pair of diametrically opposed tab elements for engagement with the pair of diametrically nopposed first receptacle elements in the first locked position;
- the ring element further comprises a pair of diametrically opposed second receptacle elements configured to allow disengagement of the second locking element from the ring element in the second unlocked position of the first locking element;
- the first locking element further comprises a locking dial element secured to the ring;
- the locking dial element comprises a user actuation portion;
- the first locking element further comprises a first visual marker positioned substantially adjacent the user actuation portion when the first locking element is in the first locked position;
- the first locking element further comprises a second visual marker positioned substantially adjacent the user actuation portion when the first locking element is in the second unlocked position;
- the lamp socket element comprises a first half of an electrical connector and the radiation source assembly comprises a second half of an electrical connector, the first half and the second half configured to make an electrical connection in the first position;
- the lamp socket element comprises a first half of an electrical connector and the radiation source assembly comprises a second half of an electrical connector, the first half and the second half configured to be electrically disconnected in the second position;
- the lamp socket element comprises a first half of an electrical connector and the radiation source assembly comprises a second half of an electrical connector, the first half and the second half configured to: (i) make an electrical connection in the first position and (ii) be electrically disconnected in the second position;
- the electrical connection between the first half and the second half is in spaced relation with respect to the fluid treatment chamber;
- the fluid treatment system further comprises a biasing element disposed in the fluid treatment chamber, the biasing element configured to apply a force on the elongate radiation source in a direction toward the lamp socket element
- the biasing element is disposed in distal portion of the fluid treatment chamber, the biasing element configured to apply a force on a distal portion the elongate radiation source in a direction toward the lamp socket element.
- the biasing element comprises a spring element
- the biasing element comprises a helical spring element; and/or
- the a spring element element comprises a variable diameter.

With particular reference to FIGS. 1(a)-1(c) and 18, there is illustrated a radiation source assembly 10 for use in a preferred embodiment of the present fluid treatment system. Radiation source assembly 10 comprises an elongate radiation source 15. Elongate radiation source 15 is preferably an ultraviolet radiation source of conventional design. Such an ultraviolet radiation source is typically encased in a protective radiation transparent sleeve, typically made from quartz. In the illustrated embodiment, the protective sleeve comprises a closed end 20.

The proximal portion of radiation source 15 is connected to a lamp head assembly 25. Lamp head assembly 25 comprises a ballast (not shown for clarity) for powering elongate radiation source 15. Lamp head assembly also comprises a pair of locking tabs 30,35 that are diametrically opposed to one another. Lamp head assembly further comprises a pair of power and data connection elements 40,45. Power and data connection elements 40,45 are configured to supply power to elongate radiation source 15 and also, in a preferred embodiment, to convey data about the nature of elongate radiation source 15 and its lamp life to a processor (not shown for clarity) disposed in lamp head assembly 25.

Radiation source assembly 10 may be comprised as a component of a fluid treatment system and is a serviceable component thereof. By this it is meant, when elongate radiation source 15 has exceeded its useful lamp life, radiation source assembly 10 may be replaced by a user.

With reference to FIGS. 2-11, there is illustrated, in a sequential manner, disposition of radiation source assembly 10 in a fluid treatment system 100. Fluid treatment system 100 comprises a fluid treatment chamber 105 having a fluid inlet 115 and a fluid outlet 108. It will be clear to those of skill in the art that the illustrations used in FIGS. 2-11 have a number of cut out portions so that the components thereof may be understood.

Figure 17:
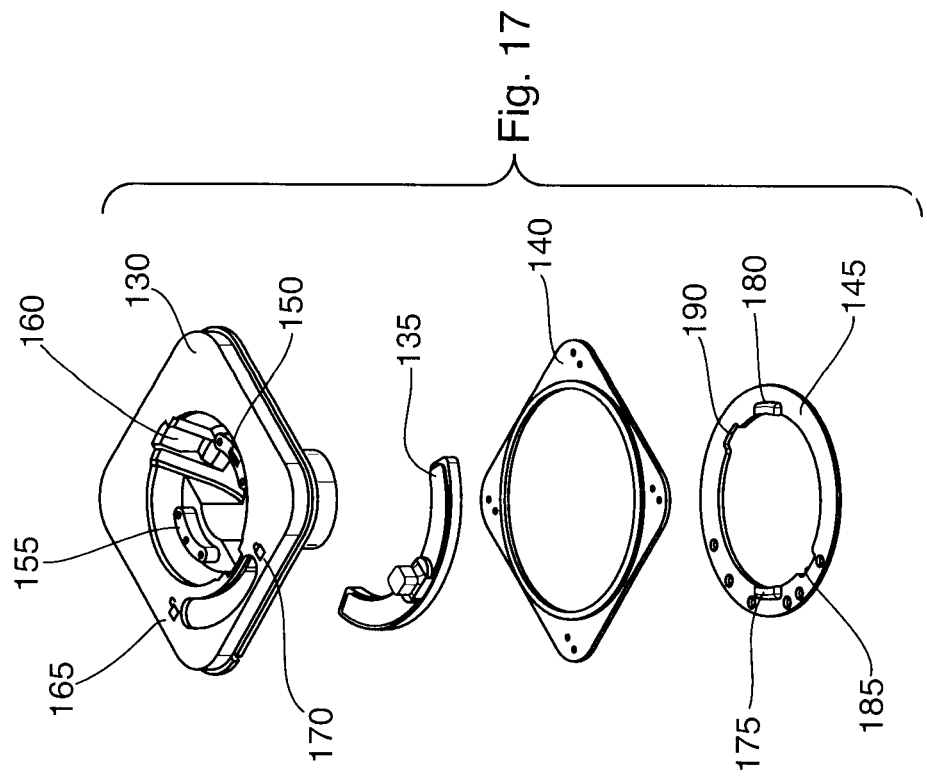
FIG. 17 illustrates the separate elements of the lamp socket element used in the fluid treatment system illustrated in FIGS. 2-16.

Disposed in a distal portion of fluid treatment chamber 105 is a helical spring element 120 having a variable diameter. As shown, the diameter of opposed ends of helical spring element 120 is larger than a mid-portion thereof. Disposed on a proximal portion of fluid treatment chamber 105 is a lamp socket element 125. With particular reference to FIGS. 3 and 17, lamp socket assembly 125 comprises a socket assembly 130, a locking dial 135, a mounting plate 140 and a retaining ring 145.

Socket element 130 comprises a pair of power and data connecting elements 150,155 which are configured to create a complementary fit and connection with power and data connecting elements 40,45 in lamp head assembly 25.

Socket element 130 further comprises a pair of diametrically opposed locking elements 160 which are configured to engage locking tab elements 30,35 in lamp head assembly 25.

Socket element 130 comprises on an upper surface thereof an "unlocked" icon 165 and a "locked" icon 170. Socket element 130 holds locking dial 135 in place and is used to establish power and data connections to radiation source assembly 10.

Locking dial 135 is connected to and serves to control retaining ring 145.

Mounting plate 140 secures retaining ring 145 with respect to fluid treatment chamber 105 while allowing retaining ring 145 to rotate.

Retaining ring 145 comprises a pair of diametrically opposed pocket elements 175,180 and a pair of diametrically opposed notch elements 185,190.

With reference to FIG. 3, there can be seen electrical connections 195 which provide a connection between power and data connecting elements 150,155 and a source of electricity 200 (FIG. 2).

When it is desired to install radiation source assembly 10 in fluid treatment chamber 105, radiation source assembly 10 is inserted in fluid treatment chamber 105 in the direction of arrow A (FIG. 3). At this point, locking dial 135 is put in an "unlocked" position by sliding locking dial 135 toward icon 165 in the direction of arrow B—see FIGS. 4-5.

With reference to FIGS. 6-7, radiation source assembly 10 is depressed all the way into fluid treatment chamber 105 in the direction of arrow A so that closed end 20 of elongate radiation source 15 is urged against spring element 120. At this point, tab elements 30,35 have cleared notch elements 185,190 in retaining ring element 145.

With reference to FIGS. 8-9, while maintaining radiation source assembly 10 in a fully depressed position in fluid treatment chamber 105, locking dial 135 is moved in the direction of arrow C into the "locked" position denoted by icon 170 on socket element 130. This movement of locking dial 135 causes pocket elements 175,180 on retaining ring element 145 to be aligned with locking tab elements 30,35 of lamp head element 25.

At this point, the depressive force on radiation source assembly 10 can be removed such that locking tab elements 30,35 of lamp head element 25 are nested in pocket elements 175,180 of retaining ring 145—see FIGS. 10-11.

Figure 12:
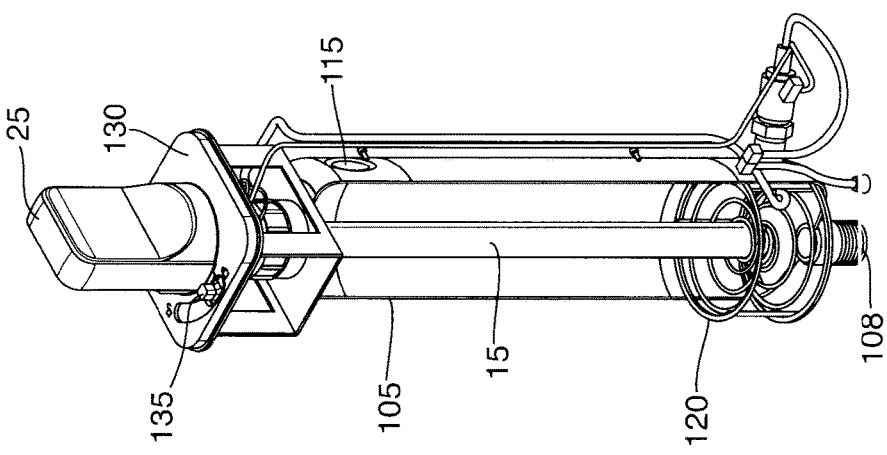
Figure 15:
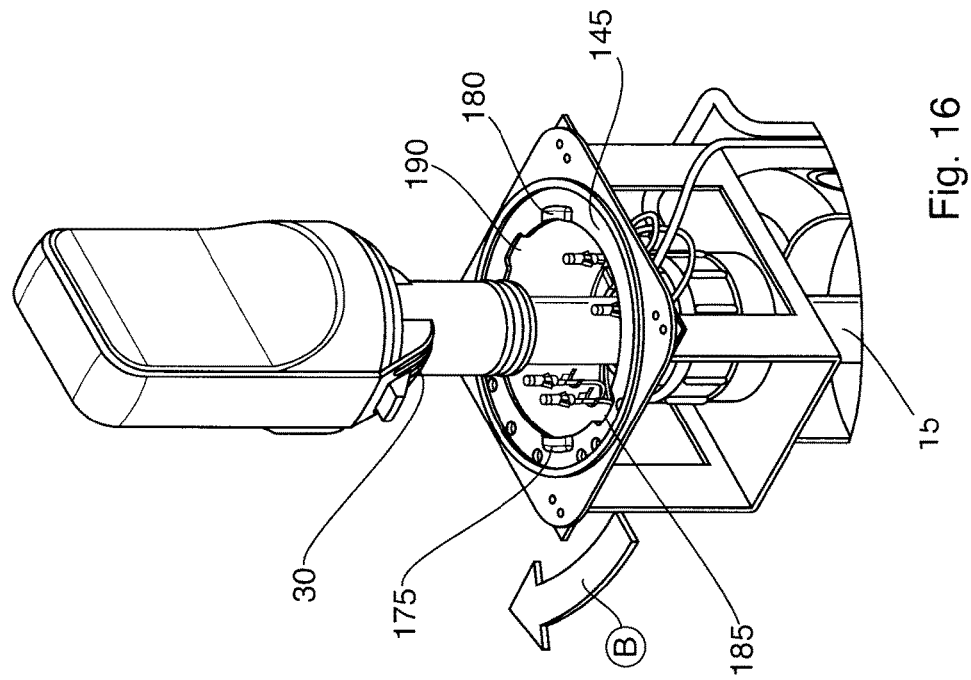
Figure 16:
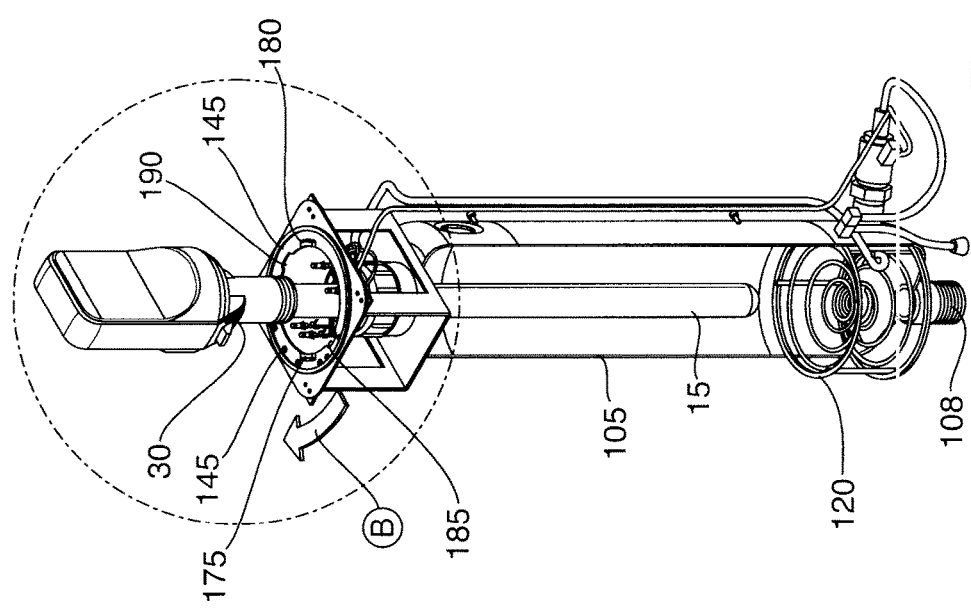
Figure 18:
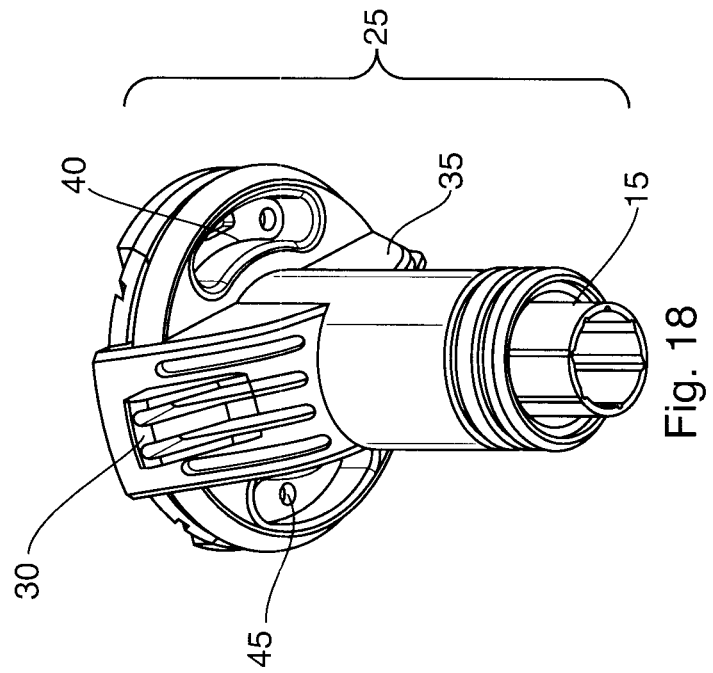
FIG. 18 illustrates a perspective view from below of a portion of the radiation source assembly illustrated in FIGS. 1-16.

FIG. 12 illustrates fluid treatment system 100 in a "ready for use" configuration. As will be understood by those of skill in the art, the configuration shown in FIG. 12 does not allow a user to move locking dial 135 toward the "unlocked" position denoted by icon 165 due to the fact that locking tabs 30,35 of lamp head element are nested in pocket elements 175,180 of retaining ring element 145 and are urged in that position by spring element 120. Once fluid treatment chamber 105 is pressurized with fluid (e.g., water), the resulting pressurization obviates or mitigates the ability of a user to depress radiation source assembly 10 in the direction of arrow A in a mistaken and/or unintentional attempt to try and withdraw radiation source assembly 10 from fluid treatment chamber 105. This represents a significant safety advantage associated with the present fluid treatment system.

FIGS. 13-16 illustrate, in a successive manner, withdrawal radiation source assembly 10 from fluid treatment system 105 using, in essence, a reversal of the steps shown in FIGS. 3-11.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. For example, the specific combination of pocket elements and notch elements their interaction with the locking tab on radiation source assembly can be modified while achieving the overall goal of securing locking dial 135 in place in configuration shown in FIG. 12. In addition, it is possible to incorporate fluid treatment system 100 in a broader fluid treatment system such as one that contains a filtration station followed by a radiation treatment station (i.e., such as the present fluid treatment system)—see, for example, U.S. Pat. No. 7,476,312 [Laing et al.].

It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A fluid treatment system comprising:
a fluid treatment chamber comprising a fluid inlet, a fluid outlet and a fluid treatment zone;
an elongate radiation source assembly comprising an elongate radiation source, wherein the elongate radiation source assembly is disposed within and removable from the fluid treatment zone of the fluid treatment chamber; and
a lamp socket element secured to a proximal portion of the fluid treatment chamber and connected to the elongate radiation source, the lamp socket element configured to be able to be disengaged from the elongate radiation source assembly only when the fluid treatment chamber is fluid non-pressurized.

2. The fluid treatment system defined in claim 1, further comprising a first locking element configured to be operable between a first locked position when the fluid treatment chamber is fluid pressurized and a second unlocked position when the fluid treatment chamber is fluid non-pressurized.

3. The fluid treatment system defined in claim 2, wherein the first locking element is movable with respect to the lamp socket element.

4. The fluid treatment system defined in claim 2, wherein the first locking element comprises a ring element.

5. The fluid treatment system defined in claim 4, wherein the ring element comprises at least one first receptacle element for engagement with a second locking element in the first locked position.

6. The fluid treatment system defined in claim 5, wherein the second locking element comprises at least one tab element for engagement with the at least one receptacle element in the first locked position.

7. The fluid treatment system defined in claim 4, wherein the first locking element further comprises a locking dial element secured to the ring.

8. The fluid treatment system defined in claim 7, wherein the locking dial element comprises a user actuation portion.

9. The fluid treatment system defined in claim 8, wherein the first locking element further comprises a first visual marker positioned substantially adjacent the user actuation portion when the first locking element is in the first locked position.

10. The fluid treatment system defined in claim 2, further comprising a biasing element disposed in the fluid treatment chamber, the biasing element configured to apply a force on the elongate radiation source in a direction toward the lamp socket element.

11. The fluid treatment system defined in claim 10, wherein the biasing element comprises a spring element.

12. A fluid treatment system comprising:
a fluid treatment chamber comprising a fluid inlet, a fluid outlet and a fluid treatment zone;
a lamp socket element secured to a proximal portion of the fluid treatment chamber, the lamp socket element comprising a first locking element configured to be operable between a first locked position when the fluid treatment chamber is fluid pressurized and a second unlocked position when the fluid treatment chamber is fluid non-pressurized;
an elongate radiation source assembly disposed within and removable from the fluid treatment zone of the fluid treatment chamber and comprising an elongate radiation source connected to the lamp socket element and a second locking element;
wherein the first locking element and the second locking element are configured to be irreversibly engaged in the first locked position when the fluid treatment chamber is fluid pressurized.

13. The fluid treatment system defined in claim 12, wherein the first locking element is movable with respect to the lamp socket element.

14. The fluid treatment system defined in claim 12, wherein the first locking element comprises a ring element.

15. The fluid treatment system defined in claim 14, wherein the ring element comprises at least one first receptacle element for engagement with the second locking element in the first locked position.

16. The fluid treatment system defined in claim 14, wherein the first locking element further comprises a locking dial element secured to the ring.

17. The fluid treatment system defined in claim 16, wherein the locking dial element comprises a user actuation portion.

18. The fluid treatment system defined in claim 12, wherein the lamp socket element comprises a first half of an electrical connector and the radiation source assembly comprises a second half of an electrical connector, the first half and the second half configured to make an electrical connection in the first position.

19. The fluid treatment system defined in claim 18, wherein the electrical connection between the first half and the second half is in spaced relation with respect to the fluid treatment chamber.

20. The fluid treatment system defined in claim 12, further comprising a biasing element disposed in the fluid treatment chamber, the biasing element configured to apply a force on the elongate radiation source in a direction toward the lamp socket element.

21. The fluid treatment system defined in claim 20, wherein the biasing element is disposed in distal portion of the fluid treatment chamber, the biasing element configured to apply a force on a distal portion the elongate radiation source in a direction toward the lamp socket element.

22. The fluid treatment system defined in claim 20, wherein the biasing element comprises a spring element.

* * * * *